(12) United States Patent
Gaebler et al.

(10) Patent No.: US 9,558,664 B1
(45) Date of Patent: Jan. 31, 2017

(54) METHOD AND APPARATUS FOR PROVIDING PARKING AVAILABILITY DETECTION BASED ON VEHICLE TRAJECTORY INFORMATION

(71) Applicant: HERE Global B.V., Veldhoven (NL)

(72) Inventors: Frank Gaebler, Berlin (DE); Olivier Dousse, Berlin (DE)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/825,756

(22) Filed: Aug. 13, 2015

(51) Int. Cl.
*G08G 1/14* (2006.01)
*G01C 21/34* (2006.01)
*G07C 5/00* (2006.01)

(52) U.S. Cl.
CPC .............. *G08G 1/14* (2013.01); *G01C 21/3415* (2013.01); *G07C 5/008* (2013.01)

(58) Field of Classification Search
CPC ..... G08G 1/14; G01C 21/3415; G01C 21/005; G07C 5/00; G07C 5/008; G07C 5/0841
See application file for complete search history.

(56) References Cited

U.S. PATENT DOCUMENTS

| | | |
|---|---|---|
| 7,783,530 B2 | 8/2010 | Slemmer et al. |
| 8,423,275 B1 * | 4/2013 | Kandal ............. G08G 1/14 340/853.1 |
| 8,847,791 B1 * | 9/2014 | Urbach ............. G08G 1/0112 340/932.2 |
| 8,963,740 B2 | 2/2015 | Koukoumidis et al. |
| 8,972,175 B2 * | 3/2015 | Annapureddy .... G01C 21/3453 701/414 |
| 8,972,178 B2 | 3/2015 | Windeler et al. |
| 2015/0123818 A1 * | 5/2015 | Sellschopp ........ G01C 21/3484 340/932.2 |

FOREIGN PATENT DOCUMENTS

| | | |
|---|---|---|
| EP | 2 332 021 B1 | 6/2011 |
| EP | 2 806 412 A1 | 11/2014 |
| WO | 2014/117016 A1 | 7/2014 |
| WO | 2016/034333 A1 | 3/2016 |

OTHER PUBLICATIONS

Mercedes-Benz India Pvt. Ltd., "Mercedes-Benz TechCenter: Active Parking Assist", webpage, retrieved on May 29, 2015 from http://techcenter.mercedes-benz.com/en_IN/active_parking/detail.html, pp. 1-2.

* cited by examiner

*Primary Examiner* — Michael J Zanelli
(74) *Attorney, Agent, or Firm* — Ditthavong & Steiner, P.C.

(57) ABSTRACT

An approach is provided for parking availability detection based on vehicle trajectory information. A trajectory processing platform processes and/or facilitates a processing of trajectory data associated with at least one journey of at least one vehicle to determine at least one portion of the at least one journey that is associated at least one parking search by the at least one vehicle. The trajectory processing platform also determines one or more street segments associated with the at least one portion of the at least one journey. The trajectory processing platform further causes, at least in part, a classification of the one or more street segments as associated with the at least one parking search. The trajectory processing platform further determines parking availability information for the one or more street segments based, at least in part, on the trajectory data.

20 Claims, 14 Drawing Sheets

METHOD AND APPARATUS FOR PROVIDING PARKING AVAILABILITY DETECTION BASED ON VEHICLE TRAJECTORY INFORMATION

BACKGROUND

Service providers and device manufacturers (e.g., wireless, cellular, etc.) are continually challenged to deliver value and convenience to consumers by, for example, providing compelling network services. One area of interest has been the development of location based services to provide parking guidance information to the users. For example, in areas (e.g., city centers, residential areas, etc.) where on-street parking is allowed, finding an available space can be difficult and takes time. Moreover, collecting data to determine parking availability information at these locations can also be difficult (e.g., resource intensive, lack of available data points at a particular location, etc.). Accordingly, service providers face significant challenges to facilitating parking availability detection from available vehicle trajectory (e.g., car trajectory) information.

SOME EXAMPLE EMBODIMENTS

Therefore, there is a need for an approach for providing parking availability detection based on vehicle trajectory information.

According to one embodiment, a method comprises processing and/or facilitating a processing of trajectory data associated with at least one journey of at least one vehicle to determine at least one portion of the at least one journey that is associated at least one parking search by the at least one vehicle. The method also comprises determining one or more street segments associated with the at least one portion of the at least one journey. The method further comprises causing, at least in part, a classification of the one or more street segments as associated with the at least one parking search. The method further comprises determining parking availability information for the one or more street segments based, at least in part, on the trajectory data.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of trajectory data associated with at least one journey of at least one vehicle to determine at least one portion of the at least one journey that is associated at least one parking search by the at least one vehicle. The apparatus is also caused to determine one or more street segments associated with the at least one portion of the at least one journey. The apparatus further causes, at least in part, a classification of the one or more street segments as associated with the at least one parking search. The apparatus is further caused to determine parking availability information for the one or more street segments based, at least in part, on the trajectory data.

According to another embodiment, a computer-readable storage medium carries one or more sequences of one or more instructions which, when executed by one or more processors, cause, at least in part, an apparatus to process and/or facilitate a processing of trajectory data associated with at least one journey of at least one vehicle to determine at least one portion of the at least one journey that is associated at least one parking search by the at least one vehicle. The apparatus is also caused to determine one or more street segments associated with the at least one portion of the at least one journey. The apparatus further causes, at least in part, a classification of the one or more street segments as associated with the at least one parking search. The apparatus is further caused to determine parking availability information for the one or more street segments based, at least in part, on the trajectory data.

According to another embodiment, an apparatus comprises means for processing and/or facilitating a processing of trajectory data associated with at least one journey of at least one vehicle to determine at least one portion of the at least one journey that is associated at least one parking search by the at least one vehicle. The apparatus also comprises means for determining one or more street segments associated with the at least one portion of the at least one journey. The apparatus further comprises means for causing, at least in part, a classification of the one or more street segments as associated with the at least one parking search. The apparatus further comprises means for determining parking availability information for the one or more street segments based, at least in part, on the trajectory data.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing parking availability detection based on vehicle trajectory information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
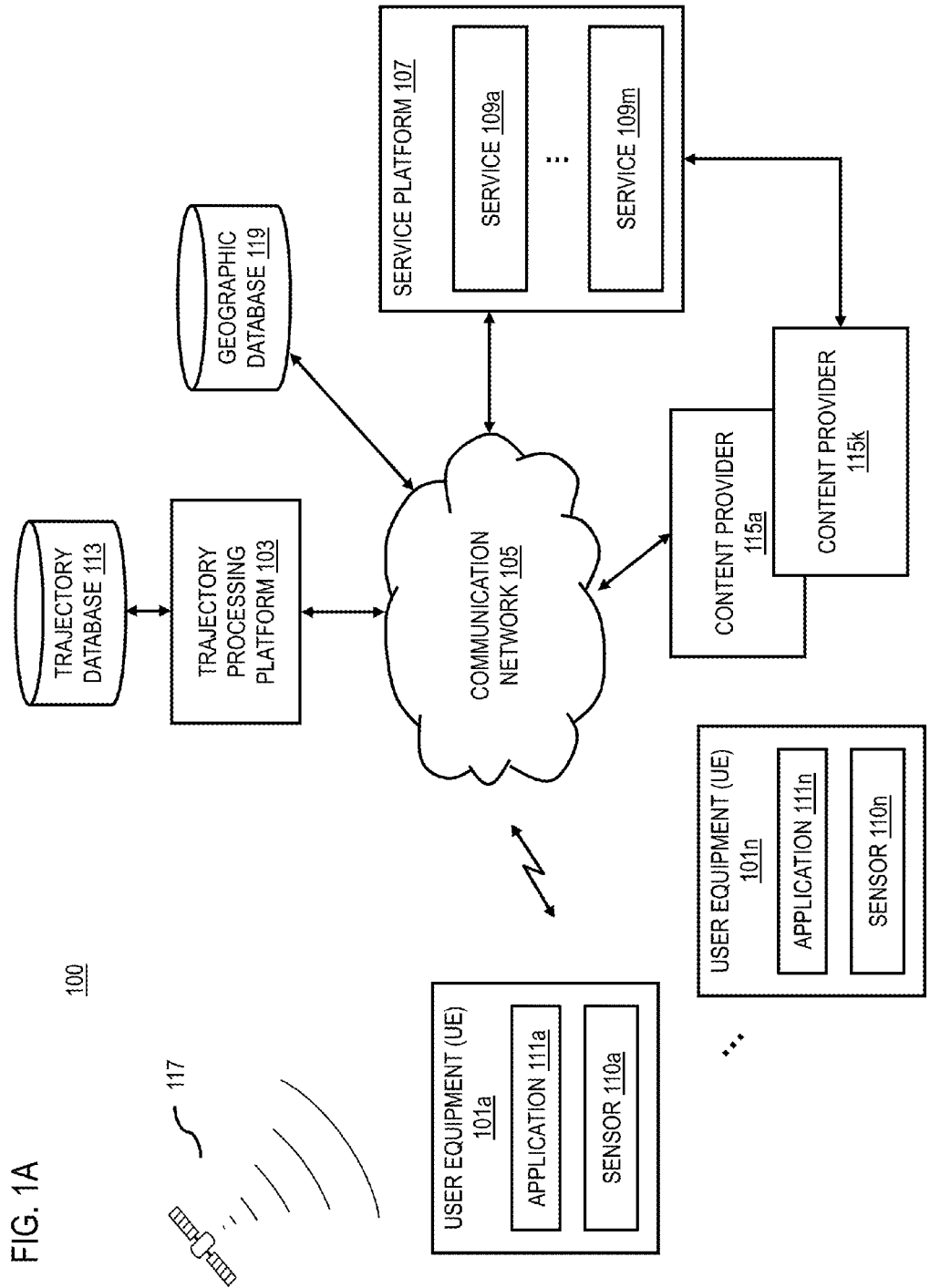
FIG. 1A is a diagram of a system for providing parking availability detection based on vehicle trajectory information, according to one embodiment.

FIG. 1A is a diagram of a system for providing state classification for a travel segment with multi-modal speed profiles, according to one embodiment. As discussed above, finding a parking space can be time consuming and frustrating, particularly in city centers or other similar areas where parking spaces may be limited or the number of parkers is high. Historically, navigation systems (e.g., embedded car navigation systems) may offer assistance in these situations by indicating parking facilities (e.g., car parks, parking garages, etc.) that are nearby. The presentation of parking facilities typically is triggered when a driver or user approaches a known or predicted location. However, if the destination is not known or cannot be predicted accurately, the systems may not be providing information relevant to the user. Moreover, the presentation of available parking facilities typically also do not provide information on parking availability within those facilities or address street parking availability.

To the extent that traditional systems provide parking availability information, these systems mainly exploit knowledge above the end points of a journey to extract the parking availability information. For example, traditional systems may apply a logic that assumes that a newly freed space may be available at a journey start point, and that at the journey's end there is a newly occupied or unavailable parking space. However, in this traditional method of estimating parking availability, each journey's start point and end point only give information about one parking space. Therefore, information about at most two parking spaces is extracted from each journey. This can potentially lead to data sparsity and less accurate or timely parking availability information, particularly if there are only a small number of vehicles participating in the data collection effort.

To address this problem, a system 100 of FIG. 1A introduces a capability to extract information about the availability of many parking spaces from each journey (as opposed, e.g., to just two spaces in traditional methods). In one embodiment, for each journey extracted from vehicle trajectory data collected from vehicles (e.g., cars) traveling in a road or travel network, the system 100 identifies at least one point in the journey when a vehicle initiates a parking search. The system 100 then classifies all street segments between the point where the driver started searching for parking and the end of the journey as full or not available for parking. In this way, the system 100 can determine parking availability information (e.g., either the availability of parking spaces or the unavailability of parking spaces) for segments other than the start or end segments of a journey. By way of example, the embodiments of the approach described herein are based the following observation: all the streets browsed by a driver who is searching for a parking space can be assumed to be full or otherwise undesirable for parking.

In one embodiment, the system 100 includes one or more processes for automatically detecting if and where in a journey a driver started searching for parking and an online service collecting this information and providing guidance to other users to find parking spaces faster. For example, as shown in FIG. 1A, the system 100 comprises:

(1) one or more cars or other vehicles (e.g., corresponding to or equipped with user equipment (UE) 101, also collectively referred to as UEs 101) collecting trajectory data and/or other related data (e.g., heading, speed, location, available sensor data, telemetry data, etc.);

(2) a server (e.g., a trajectory processing platform 103) for receiving the data and performing aggregation of the trajectory data to provide parking availability information and related navigation instructions; and (3) one or more client cars or vehicles (e.g., also corresponding to or equipped with UEs 101) for consuming the parking availability information and/or related navigation instructions generated by the trajectory processing platform 103.

In one embodiment, the data-collecting UEs 101 and the client UEs 101 can be the same vehicles. In this way, for instance, the drivers or owners of the associated vehicles can have an incentive to use the system for sharing trajectory data and receiving parking availability information. Additionally, if the data collecting UE 101 and the client UE 101 is the same vehicle, the system 100 (e.g., the trajectory processing platform 103) can use the point where the parking search request was initiated by the client UE 101 to sharply define this point on the trajectory as where a parking search starts. In this way, the system 100 can more precisely define the initiation of a parking search. In one embodiment, the UEs 101 and the trajectory processing platform have connectivity via a communication network 105.

In one embodiment, the data-collecting vehicles are equipped with a device (e.g., the UE 101 or other accessory device) that records the vehicles' trajectory data (e.g., position, speed, etc.). In one embodiment, the UE 101 may be configured with one or more sensors 110a-110n (also collectively referred to as sensors 110) for determining the trajectory data. By way of example, the sensors 110 may include location sensors (e.g., GPS), accelerometers, compass sensors, gyroscopes, altimeters, etc. In one embodiment, the trajectory data can be segmented into "journeys". Journeys, for instance, are the pieces or portions of the trajectory data that can be separated into distinct segments. In one embodiment, journeys are delimited by parking events. For example, a parking event may be detected when it is determined that a vehicle's is engine off, the key is outside of the car, the vehicle door is locked, and/or the like.

In one embodiment, after a journey or the trajectory data is recorded (e.g., upon parking), the trajectory data is analyzed (e.g., by respective applications 111a-111n and/or the trajectory processing platform 103 for storage in, for instance, a trajectory database 113 and/or the geographic database 119) to detect which part of the journey (if any) correspond to a parking search. A list of street or travel segments covered by the parking search (if any) is then generated. In one embodiment, timestamp information indicating at which time the street segment was traveled or browsed is also included with the list. In one embodiment, the list is then transmitted or uploaded to the trajectory processing platform 103. In addition or alternatively, the raw trajectory data may be uploaded to the trajectory processing platform 103 to determine the travel segments covered by the parking search and associated timestamp information. In yet another embodiment, the list and/or trajectory data may be maintained at the UE 101 device for local processing to determine parking availability information for transmission to the trajectory processing platform 103 and/or other vehicles/UEs 101 (e.g., when operating in a peer-to-peer network architecture).

In one embodiment, the trajectory processing platform 103 is configured with a list of parking areas and/or streets/travel segments within these areas that are to be monitored for parking availability information. In addition, the trajectory processing platform 103 may have access to information about the amount of parking spaces in each of the travel segments. In one embodiment, information on the parking areas, the travel segments, the amount of parking spaces, and/or related information are stored in a geographic database 119. In addition or alternatively, the information can be provided by the service platform 107, one or more services 109a-109m (also collectively referred to as services 109), one or more content providers 115a-115k (also collectively referred to as content providers 115), or a combination thereof. For example, the sources of the information may include map data, information inferred from data collected from participating vehicles, or a combination thereof.

In one embodiment, the trajectory processing platform 103 receives lists of visited travel segments and/or trajectory data for determining the visited travel segments from a plurality of participating UEs 101. The received information may also be associated with timestamp information and/or other contextual information. As previously noted, since these travel or street segments were checked for parking by the drivers of the vehicles searching in the area, the trajectory processing platform 103 can infer that the segments were full or parking was otherwise unavailable or undesirable at the segments and at the given timestamp (if provided). In one embodiment in which timestamp information is available, for each travel or street segment of interest, the trajectory processing platform 103 retains the latest time at which it was reported that parking was unavailable by a vehicle or UE 101. For example, the trajectory processing platform 103 can maintain one timestamp (or any number of configured timestamps) of parking availability information per travel segment of interest.

In one embodiment, when a client UE 101 requests instructions to find parking in a given area or location, the trajectory processing platform 103 computes a route spanning the streets or travel segments of the area such that the travel segments with the smaller (earlier) timestamp are visited first. In one embodiment, another criteria for the ordering of the streets or travel segments is information about the amount and/or the fluctuation of parking spaces on the streets or travel segments. By way of example, the statistics (e.g., amount and/or fluctuation) can calculated from the trajectory data (e.g., tracks) received from participating vehicles (e.g., UEs 101). In this way, for instance, if two or more travel segments have similar timestamps, the one with the greater fluctuation and/or amount of parking spaces will be presented or recommended for searching first. The trajectory processing platform 103 can then send or present the instructions and/or route with the recommend travel segments to search (e.g., recommended based on parking availability information such as parking availability timestamp information, amount of parking spaces, fluctuation in the parking availability information, etc.).

In one embodiment, apart from an optimal or recommended parking search route, the trajectory processing platform 103 may also send the information as a map overlay that illustrates, for instance, timestamps, amount of parking spaces available, and fluctuations in the amount of available parking spaces, etc. around the a selected location or position (e.g., a current location of the client UE 101). This mode of operation may be used, for instance, when a precise target destination of the vehicle or UE 101 is not known.

In one embodiment, client vehicles are equipped with a navigation device (e.g., a UE 101) that is capable of submitting requests for parking instructions to the trajectory processing platform 103), and of guiding a driver of the vehicle along the received route. In one embodiment, as the driver follows the received route, the client UE 101 (e.g., via a navigation application 111) may iterate the parking instruction request to the trajectory processing platform 103 and update the resulting route periodically in case updated information has been transmitted to or generated by the trajectory processing platform 103.

In one embodiment, requests for parking instructions can be triggered by interactions with a user interface of the UE 101 (e.g., an explicit request from a user or driver), or automatically when the driver or vehicle approaches a target destination (e.g., a set destination, an inferred destination, and/or any other known destination). In yet another embodiment, the client UE 101 can initiate a parking instruction request when the UE 101 detects that the vehicle has initiated a parking search. In this way, parking instructions can be provided even when no destination is set or known by the system 100.

In one embodiment, the system 100 can detect an initiation of a parking search by a vehicle by processing trajectory data based on the assumption that drivers typically take near-to-optimal routes to reach a destination (e.g., in the sense of a shortest or fastest route to a destination). However, this optimality may no longer be present when a driver starts looking for a parking space. For example, the driver typically tries to find a parking spot right at or as near as possible to the destination and then explores the street or travel network around this spot with increasing distance. In many cases, this exploration is performed in an "irregular" process whereby driving behavior may deviate from normal routines or become erratic (e.g., paths doubling back on itself, intersecting itself repeatedly, etc.).

In one embodiment, the system 100 (e.g., via the trajectory processing platform 103 and/or the application 111) can detect a parking search by processing trajectory data according to the following algorithm: if a vehicle or UE 101 is currently at point B, the previously driven track is analyzed for optimality. For example, the system 100 selects a previous track point A (e.g., 1000 m or any other configured distance before point B) and uses point A as a starting point for a route calculation to point B. Then the quotient of the track length of the optimal route is computed. In one embodiment, the system 100 can consider a track to be optimal if the quotient or ratio is close to 1.0 (e.g., within a threshold window). However, if the quotient varies from the 1.0 beyond a threshold value (e.g., typically a value greater than 1.0), then the system 100 can assume that vehicle is currently engaged in a parking search. In one embodiment, an adjusted threshold value or window can be used to distinguish between an optimal track and parking search track. It is contemplated that the system 100 can determine the adjusted threshold using any manual or automated process. For example, the system 100 can use a trained machine learning classifier to determine a threshold value for distinguishing an optimal track from a parking search track.

In one embodiment, if a parking search is detected for point B based on the observed trajectory data, the process can be repeated from a track point B' some distance before B. If B' is also classified as "parking search", the whole track segment connecting B' and B is classified accordingly. This process can be repeated until the "parking search" criteria fails (e.g., by comparing the calculated quotient or ratio against the threshold value or window).

In one embodiment, the system 100 can be limited to processing journeys or trajectory data segments delimited by parking events. In this way, the system 100 is more likely to exclude irregular trajectories or non-optimal tracks resulting from when a driver is lost (which may not end with a parking event and continue once a driver is no longer lost). It yet another embodiment, it is contemplated that the system 100 can use other criteria to detect and/or exclude specific parking search behavior. For example, parking search behavior might be indicated if a driven track shows self-intersections, have street segments that are driven multiple times, etc. Additionally, when searching of parking, a vehicle's or driver's speed profile might be slower or more irregular than average for a given travel segment, the vehicle may be located in a lane next to a parking lane, etc.

As shown in FIG. 1A, the traffic processing platform 103 operates in connection with one or more UEs 101 for providing parking availability information based on vehicle trajectory information or data. By way of example, the UEs 101 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system. Also, the UEs 101 may be configured to access a communication network 105 by way of any known or still developing communication protocols. Via this communication network 105, the UE 101 may transmit probe data as well as access various network based services for facilitating state classification.

Also, the UEs 101 may be configured with navigation applications 111 for interacting with one or more content providers 115, services 109 of a service platform 107, or a combination thereof. Per these services, the navigation applications 111 of the UE 101 may acquire parking search instructions, navigation information, location information, mapping information and other data associated with the current location of the vehicle, a direction or movement of the vehicle along a roadway, etc. Hence, the content providers 115 and services 109 rely upon the gathering of vehicle trajectory data for executing the aforementioned services.

The UEs 101 may be configured with various sensors 110 for acquiring and/or generating trajectory data regarding a vehicle, a driver, other vehicles, conditions regarding the driving environment or roadway, etc. For example, sensors 110 may be used as GPS receivers for interacting with one or more satellites 117 to determine and track the current speed, position and location of a vehicle travelling along a roadway. In addition, the sensors 110 may gather tilt data (e.g., a degree of incline or decline of the vehicle during travel), motion data, light data, sound data, image data, weather data, temporal data and other data associated with the vehicle and/or UEs 101 thereof. Still further, the sensors 110 may detect local or transient network and/or wireless signals, such as those transmitted by nearby devices during navigation of a vehicle along a roadway. This may include, for example, network routers configured within a premise (e.g., home or business), another UE 101 or vehicle or a communicable traffic system (e.g., traffic lights, traffic cameras, traffic signals, digital signage). In one embodiment, the traffic processing platform 103 aggregates probe data gathered and/or generated by the UEs 101 resulting from the driving of multiple different vehicles over a road/travel network. The probe data may be aggregated by the traffic processing platform 103 to multi-modal classification.

By way of example, the trajectory processing platform 103 may be implemented as a cloud based service, hosted solution or the like for performing the above described functions. Alternatively, the traffic processing platform 103 may be directly integrated for processing data generated and/or provided by one or more services 109, content providers 115, and/or applications 111. Per this integration, the traffic processing platform 103 may perform client-side parking availability detection based on vehicle trajectory information and/or parking search detection.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, traffic processing platform 103, the service platform 107, and the content providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
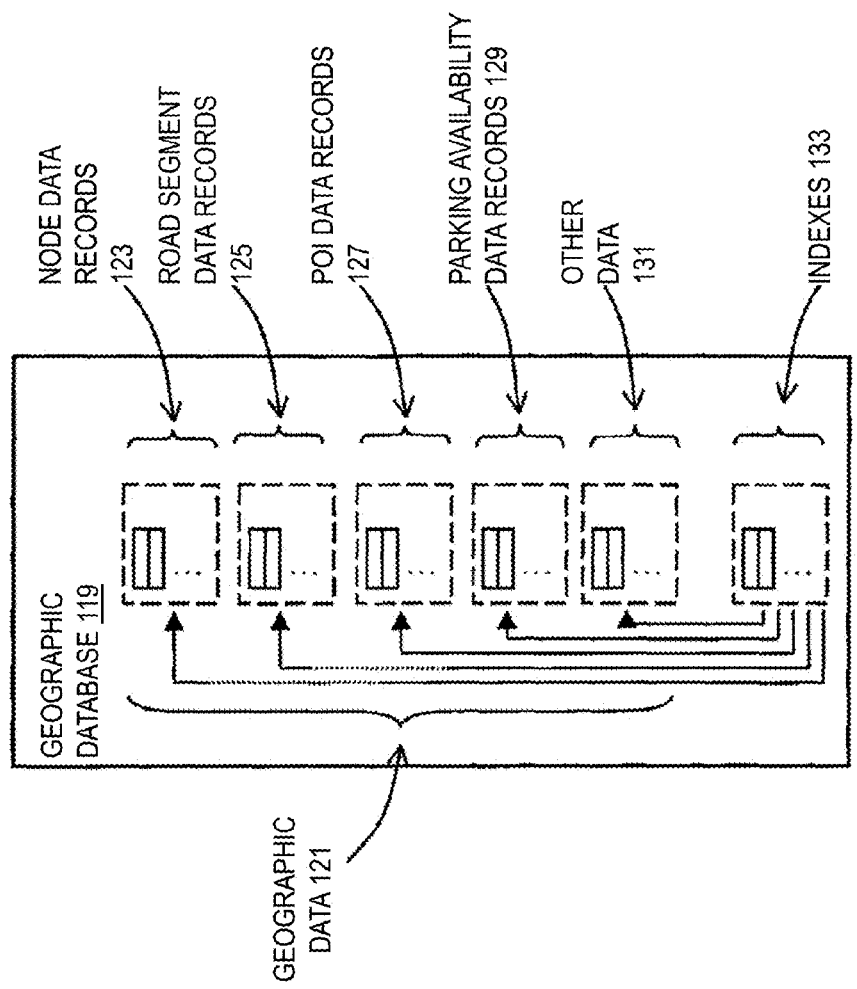
FIG. 1B is a diagram of a geographic database, according to one embodiment.

FIG. 1B is a diagram of the geographic database 119, according to one embodiment. In one embodiment, parking availability information and/or any other information used or generated by the system 100 with respect to providing parking availability detection based on vehicle trajectory information can be stored, associated with, and/or linked to the geographic database 119 or data thereof. In one embodiment, the geographic or map database 119 includes geographic data 121 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 119 includes node data records 123, road segment or link data records 125, POI data records 127, parking availability data records 129, and other data records 131, for example. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In one embodiment, the POI data records 127 may also include information on locations of traffic controls (e.g., stoplights, stop signs, crossings, etc.).

In exemplary embodiments, the road segment data records 125 are links or segments representing roads, streets, or paths, as can be used in the calculated route or recorded route information. The node data records 123 are end points corresponding to the respective links or segments of the road segment data records 125. The road link data records 125 and the node data records 123 represent a road network, such as used by vehicles, cars, and/or other entities. Alternatively, the geographic database 119 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 119 can include data about the POIs and their respective locations in the POI data records 127. The geographic database 119 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city).

In one embodiment, the parking availability data records 129 can include any data item used by the trajectory processing platform 103 including, but not limited to parking areas, travel segments within the parking areas to monitor, number of spaces, parking availability information, timestamp information for the parking availability information, fluctuation information about the parking availability information, parking search behaviors, trajectory data, travel profile information, user preferences, and/or the like.

The geographic database 119 can be maintained by the content provider in association with the service platform 107 (e.g., a map developer). The map developer can collect geographic data to generate and enhance the geographic database 119. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 119 can be a master geographic database stored in a format that facilitates updating, maintenance, and development. For example, the master geographic database 119 or data in the master geographic database 119 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 119 can be a master geographic database, but in alternate embodiments, the geographic database 119 can represent a compiled navigation database that can be used in or with end user devices (e.g., UEs 101) to provided navigation-related functions. For example, the geographic database 119 can be used with the end user device 101 to provide an end user with navigation features. In such a case, the geographic database 119 can be downloaded or stored on the end user device UE 101, such as in applications 111, or the end user device UE 101 can access the geographic database 119 through a wireless or wired connection (such as via a server and/or the communication network 105), for example.

Figure 2:
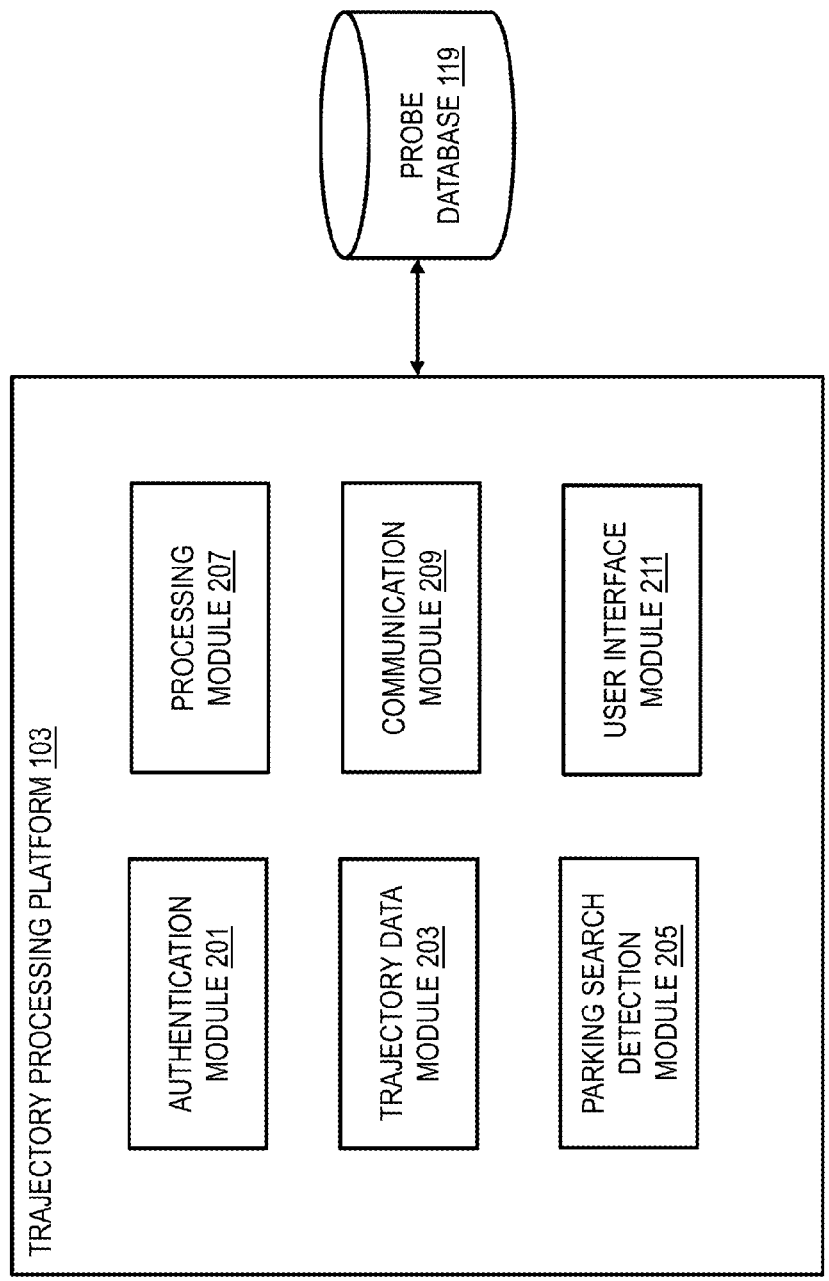
FIG. 2 is a diagram of the components of a trajectory processing platform, according to one embodiment.

FIG. 2 is a diagram of the components of a trajectory processing platform, according to one embodiment. By way of example, the trajectory processing platform 103 includes one or more components for providing parking availability detection based on vehicle trajectory information. It is contemplated that the functions of these components may be combined or performed by other components of equivalent functionality. In this embodiment, the trajectory processing platform 103 includes an authentication module 201, a trajectory data module 203, a parking search detection module 205, a processing module 207, a communication module 209, and a user interface module 211.

In one embodiment, the authentication module 201 authenticates drivers/vehicles and/or associated UEs 101 for interaction with the trajectory processing platform 103. By way of example, the authentication module 201 receives a request to access the trajectory processing platform 103 via an application 111. The request may be submitted to the authentication module 201 via the communication module 209, which enables an interface between the navigation application 111 and the platform 103. In addition, the authentication module 201 may provide and/or validate access by the UE 101 to upload trajectory data, lists of travel segments classified as under a parking search, timestamp information for the segments searched, and/or other location-based information to the platform 103. In one embodiment, the authentication module 201 may further be configured to support and/or validate the formation of profile by a provider of a service 109 or content provider 115, e.g., for supporting integration of the capabilities for providing parking availability detection based on vehicle trajectory information with said providers 115 or services 109.

The trajectory data module 203 collects and/or analyzes trajectory data as generated by one or more authenticated UE 101. For example, the trajectory data module 203 aggregates the trajectory data and or lists of searched travel segments generated by the UE 101. In one embodiment, the trajectory data module 203 may receive other related data along with the trajectory data or segment lists such as acceleration, road curvature, vehicle tilt, driving mode, brake pressure, etc. It then stores the received data to database 113 optionally in association with a unique identifier of the vehicle, driver of UE 101 that transmitted the trajectory data or lists.

In one embodiment, unprocessed trajectory data are received from the UEs 101, the trajectory data module 203 interacts with the parking search detection module 205 to initiate processing of the trajectory data to perform parking search detection. In one embodiment, the parking search detection module 205 uses machine learning classification to detect which portions of journeys determined from trajectory data correspond to parking searches or parking search behaviors. In one embodiment, the processing steps described with respect to the trajectory data module 203 can be applied in whole, in part, or not at all depending on the characteristics or nature of the unprocessed trajectory data. The examples discussed below illustrate processing steps that can be applied to trajectory data that is not well delimited with respect to journeys and modes of transport (e.g., vehicular and non-vehicular traffic may be combined). Accordingly, because trajectory data collected from embedded navigation systems (e.g., vehicle infotainment systems) may be more accurately delimited, the some or all of the processing steps described below may not be needed. In one embodiment, the type of processing to perform on unprocessed trajectory data can be automatically determined by the trajectory processing platform 103 and/or specified manually by an operator of the trajectory processing platform 103.

By way of example, the parking search detection module 205 can initiate the machine learning process by processing training data (e.g., raw trajectory data or tracks collected from UEs 101 or received from one or more track data sources such as content providers 115 and/or services 109). In one embodiment, the training data consists of tables of GPS positions (e.g., timestamp, latitude, longitude, altitude, speed, heading, etc.) associated to an anonymized user identifier (e.g., corresponding to a contributing UE 101 or vehicle). Depending on the originating data source, some of the trajectory data or tracks are map-matched and some are not. Accordingly, the parking search detection module 205 may perform map-matching as needed to associate the tracks with known street or travel segments.

If the trajectory data have not previously been segmented into discrete journeys (e.g., journeys with well-defined start points and endpoints), the parking search detection module 205 processes the trajectory data to split the data in journeys, detect stopovers, and the like. For example, the parking search detection module 205 can programmatically identify gaps (e.g., temporal and/or spatial gaps) in the trajectory data to identify potential discrete journeys or trips within the data. In some cases (e.g., where the track recording device is portable such as a smartphone or portable navigation device), the recorded trajectory data may not necessarily be vehicle-only and can potentially include pedestrian or other non-vehicular tracks. For example, the track recording device can continue to record after the vehicle was parked or during a stopover, so the device may actually have recorded pedestrian motion. On the other hand, the trajectory data or tracks might not contain a complete journey because, e.g., the driver switched the track recording device off before reaching the actual destination to save battery life or because it was no longer needed. In yet another scenario, depending on the data sources or how the training data were collected, the trajectory may have a bias to towards either longer or shorter trips.

Accordingly, in one embodiment, processing of the training comprises, for instance:
(1) Splitting user data into potential vehicle trajectories or journeys with a well-defined start point and/or endpoint;
(2) Removing non-vehicular motion (e.g., pedestrian motion);
(3) Filtering the trajectory data based on one or more heuristics to find tracks or journeys with potential parking search behavior at the end of the journey; and
(4) Classifying or annotating the trajectory data and/or the associated travel segments as either engaged in driving or a parking search.

It is noted that the step of filtering the trajectory based on heuristics is optional and can be applied in cases where the probability of finding tracks or trajectory data with characteristics parking search behavior is expected or determined to be low.

In one embodiment, for the splitting step, first all gaps between adjacent positions are detected. For example, a gap is assumed if the duration is larger than a predetermined time threshold (e.g., 3 minutes) or the distance is larger than a distance threshold (e.g., 1 km). In a second step, the tracks or trajectory data are split and/or truncated if segments of non-vehicular motion (e.g., pedestrian motion) are detected. Indicators for non-vehicular or pedestrian motion segments include, but are not limited to: a speed below a threshold value (e.g., 7 km/h) and/or a randomness in the heading value.

In one embodiment, for the filtering step, tracks are analyzed to determine if a track shows non-optimal driving behavior at the end of the track (e.g., non-optimal is deviation from a shortest route or a fastest route as previously discussed). As previously described, the analysis is based on a calculating a quotient of the actual track length to the length of an optimal route from specified points along the track. The quotient or ratio will be close to 1.0 if the track is optimal and deviate from 1.0 beyond a threshold window in a non-optimal case. Generally, the quotient or ratio will be larger than one in this case because it is likely that a parking search will result in a greater distance traveled versus the optimal route.

In one embodiment, for the classification step, the parking search detection module 205 can identify the travel segments in the journey tracks and then annotate those segments with attributes that indicate the segment is associated with driving or searching (e.g., parking searching). In one embodiment, it is contemplated that the parking search detection module 205 can define any number categories in addition to driving and searching. For example, a "grayzone" category can be added in cases where the classification is unclear or where satisfaction of one or more classification criteria is marginal. Table 1 below is illustrates three example categories and their descriptions.

TABLE 1

| Category | Description |
| --- | --- |
| Driving | Segments that show a clear driving intention to reach some destination |
| Grayzone | Segments where the driver might have started looking for a parking space |
| Searching | Segments that show clear parking search behavior |

After splitting and annotating the training data, the parking search detection module 205 interacts with the processing module 207 to initiate the machine learning classification process. In one embodiment, a typical machine learning classification problem uses training data that consists of a vector of pairs (e.g., features, categories), wherein features is a tuple of input values, and category is the associated output value (or class) that should be learned by the classifier. Give the list of annotated tracks provided by the parking search detection module 204, the category, for instance, corresponds to the drive mode or category at each track point or segment. Accordingly, finding good values or features for each track point that may indicate a parking search is the goal of the machine learning classification.

In one embodiment, the processing module 207 performs feature extraction for the machine learning classification process based on one or more of the following features: (1) track cost, (2) track speed; (3) track straightness; (4) road class; (5) urbanity flag; and (6) parking lane flag.

In one embodiment, the track cost feature is based on the route optimality criteria previously described. For example, given a point B on the track, a previous point A on the track is selected (e.g., 1000 meters before) and a route calculation is done to point B (e.g., shortest or fastest route). The track cost is computed as the ratio of the track length to the route length. The higher the track cost is at point B, the more likely it is that the driver is searching for parking. In one embodiment, for the annotated tracks, costs can be calculated at predetermined intervals along the track (e.g., at 500 m, 1000 m, and 1500 m). In one embodiment, it is noted that track costs can also be based on the ratio of track duration to route duration, or any similar metric.

In one embodiment, the track speed feature can be relatively low when the driver is looking for a parking space. Given a track point, the average speed of the previous track segments is calculated. In one embodiment, the track speed can be calculated at predetermined distances (e.g., at 500 m, 1000 m, and 1500 m). In on embodiment, the current speed can be taken as another potential feature.

In one embodiment, track straightness can be relatively low during a parking search. By way of example, track straightness can be computed using the heading value in the form of a two-dimensional direction (cos(heading), sin (heading)). For a given track segment, the straightness can be computed as the normalized length of the sum of the direction vectors for each point p in the segment:

$$\text{straightness}(\text{segment}) = \frac{\left\| \sum_{p \in \text{segment}} (\cos(\text{heading}_p), \sin(\text{heading}_p)) \right\|}{\text{number of } p \in \text{segment}}$$

In one embodiment, for a perfectly straight track, the straightness value will be 1. The more convoluted the actual track is, the more the straightness will be close to 0. The straightness value can also be calculated at different distances.

In one embodiment, the road class feature might give an indication of whether parking is possible at all in a given segment. For example, if the current road class is highway, the driver is most likely not looking for a parking space. In one embodiment, the road class is determined by map matching tracks to the roads of a map (e.g., stored in the geographic database 119).

In one embodiment, the urbanity flag indicates whether a vehicle is currently driving in a city center or other urban area, wherein parking search problems are more likely to happen. Conversely, parking search problems are not likely to occur in rural areas. In one embodiment, the urbanity flag can be determined from attribute data associated mapmatched road elements. In another embodiment, the urbanity flag can also be inferred indirectly by, for instance, the density of cars parked nearby, traffic flow, traffic volume, etc.

In one embodiment, the parking lane flag indicates whether a road element or segment provides a lane for parking. For example, parking search is less likely if the tracks pass roads without a parking lane. In one embodiment, the parking lane flag can be determined through map data and/or inferred from cars parked nearby.

In one example use case, the first three features (e.g., track cost, track speed, and track straightness) can be used with respective distances of 1500 m, 1000 m, and 500m from the current or last location in the track. For track speed, the current speed can also be added resulting in a total of 10 features:

Cost-1500;
Cost-1000;
Cost-500;
Speed-1500;
Speed-1000;
Speed-500;
Speed-Current;
Straightness-1500;
Straightness-1000; and
Straightness-500.

In one embodiment, once the features are extracted for each track point of the training data, the processing module 207 uses the features performs the machine learning classification (e.g., using available machine learning libraries such as scikit-learn, WEKA, etc.). An example case using the Python-based scikit-learn machine learning library is discussed below. In this use case, the classifiers can include, but are not limited to, any one or more of the following:

SVM (kernel: rbf);
GuaussianNB;
AdaBoostClassifier;
RandomForest; and
DecisionTreeClassifier.

In addition or alternatively, a simple classifier that implements, for instance, simple heuristics on a single feature (e.g., track cost feature) that does not require training by any data can be used. An example of such a simple classifier is provided in Table 2 below.

TABLE 2 mode=driving
if (cost_1500) > THRESHOLD_1500 or
  cost_1000 >THRESHOLD_1000 or
  cost_500 >THRESHOLD_500):
  mode = searching In one embodiment, the processing module 207 can determine an optimal classifier from among the available classifiers using track-based cross validation. More specifically, in one embodiment, the validation is performed as follows: each track point of the annotated tracks was classified with a classifier. In one embodiment, the classifier was trained from the remaining tracks not being classified. For example, if there are 80 track points to be classified, one track point will be classified, and the remaining 79 track points will be used to train the classifier. The mode (e.g., driving or searching) predicted by the classifier is then compared to the mode annotated to the segment by the parking search detection module 205 (e.g., using an alternative process such as manual annotation). A score for each classifier can then be computed as the number of successful predictions divided by the total number of points or segments annotated as either driving or searching (e.g., by excluding grayzone category track points if any).

In one embodiment, the processing module 207 can further tune or optimize the classifier by determining an optimal feature subset for each classifier. In one embodiment, determining the optimal feature subset can be performed using, for instance, a brute-force approach, by computing the prediction score for every possible subset of the entire feature set on each classifier. Similarly, the simple classifier discussed above can be optimized by allowing the cost threshold values (e.g., THRESHOLD_1500, THRESHOLD_1000, and THRESHOLD_500) to vary across a specified range (e.g., [0.1, 3.0]) to determine which values result in the best prediction score.

In one embodiment, the processing module 207 can further tune the classifier to reduce the potential for false positives (e.g., classifying a segment as searching when in fact it's mode should be driving). For example, wrongly classified search segments can appear at the beginning of a track (e.g., within the first 1 km). This is due to the fact that for short tracks a few meters difference between track length and route length might already be significant with respect to the cost ratio. In one embodiment, the processing module

207 can be configured to apply higher threshold values or to exclude entirely early segments that are classified as search segments because it is unlikely that a parking search would start right at the beginning of a journey.

In some cases, false positives may result from map matching problems. For example, if the map matcher is putting a track point to the wrong road or travel segment, route calculations may be significantly longer or shorter. In one embodiment, the processing module 207 can exclude segments classified as search segments that exhibit large jitters (e.g., above a threshold value) with respect to matching a track to a road network map.

In one embodiment, the processing module 207 can further reduce potential false positives (e.g., resulting from any number of known or unknown causes) by performing a smoothing of the predicted optimal route rather than strictly adhering to the boundaries of map matched travel or road segments.

In one embodiment, the processing module 207 can also control for potential false negatives (e.g., classifying a segment as driving when the segment was annotated as searching). In one way, the false negative problem can be seen as an annotation problem (e.g., where the classification of driving is correct and the underlying annotation of searching is incorrect). For example, when doing the annotation, no limit may have been placed on the maximum extent or distance of a parking search, which can result in some segments at the end of a journey being annotated as searching when a parking search is no longer taking place.

Another possible reason for wrongly annotated parking search segments might be, that the track was not properly split because very short stopovers had not been identified properly. For instance, a mail delivery vehicle in a neighborhood might show very convoluted tracks, that are nevertheless clearly directed and optimal between each stopover. In one embodiment, the processing module 207 can use additional sensor data from the vehicle (e.g., door events, engine stop events), additional contextual information (e.g., user driving history, user calendar, user activity, etc.), or a combination thereof to avoid potential false negatives or wrong annotations.

In one embodiment, once a parking search is inferred based on the observed trajectory data or from a client-side parking availability request, the processing module 207 can interact with the communication module 209 and/or the user interface module 211 to present the parking availability information, recommended segments to search for available parking, related navigation instructions, and/or other information related to parking availability and parking search detection determined for vehicle trajectory information.

For example, the processing module 207 can provide information to support drivers in finding a parking space by applying knowledge of recent parking search trajectories of other drivers nearby. As previously discussed, in one embodiment, the street or travel segments that are driven while doing a parking search can classified has no having no parking space that is available. Another driver, reaching the area shortly afterwards (e.g., within a threshold time period) with the same intent to find a parking space, could then be proposed a parking search route that avoids those streets that had been checked recently without success. Because the system 100 enables parking availability information to be inferred from segments that have been searched during a journey, the system 100 is able to provide parking availability information for more street or travel segments even with the trajectory data are sparse.

It is further noted that the user interface module 211 may operate in connection with the communication module 209 to facilitate the exchange of parking availability information and/or parking search detection information via the communication network 105 with respect to the services 109, content providers 115 and applications 111. Alternatively, the communication module 209 may facilitate transmission of the inferred hidden states and related information directly to the services 109 or content providers 115.

The above presented modules and components of the trajectory processing platform 103 can be implemented in hardware, firmware, software, or a combination thereof. Though depicted as a separate entity in FIG. 1A, it is contemplated that the platform 103 may be implemented for direct operation by respective UEs 101. As such, the traffic processing platform 103 may generate direct signal inputs by way of the operating system of the UE 101 for interacting with the application 111. In another embodiment, one or more of the modules 201-211 may be implemented for operation by respective UEs 101 as a platform 103, cloud based service, or combination thereof.

Figure 3:
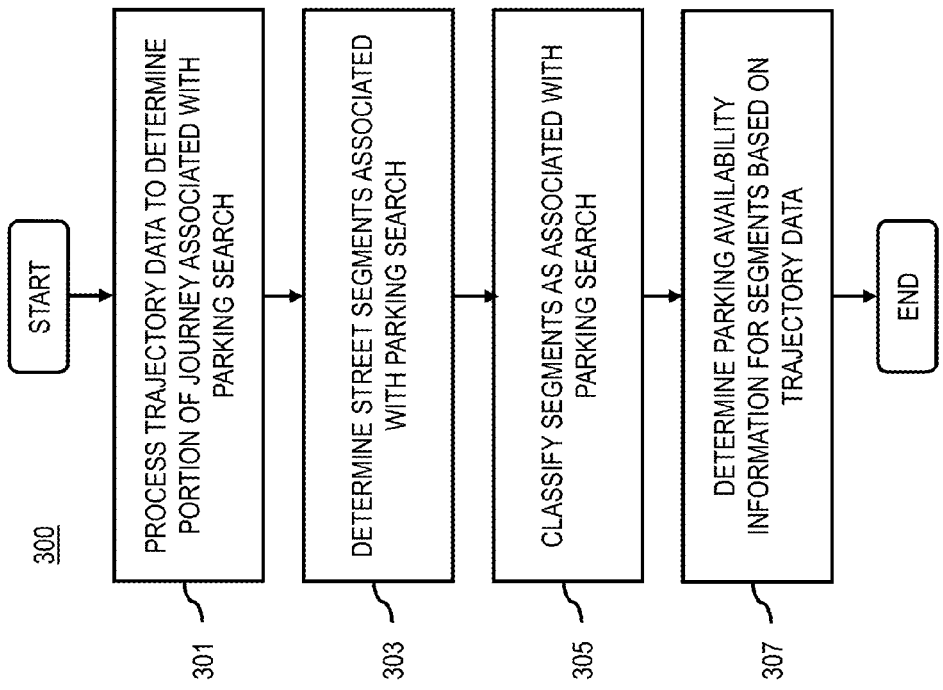
FIG. 3 is a flowchart of a process for providing parking availability detection based on vehicle trajectory information, according to one embodiment.
Figure 11:
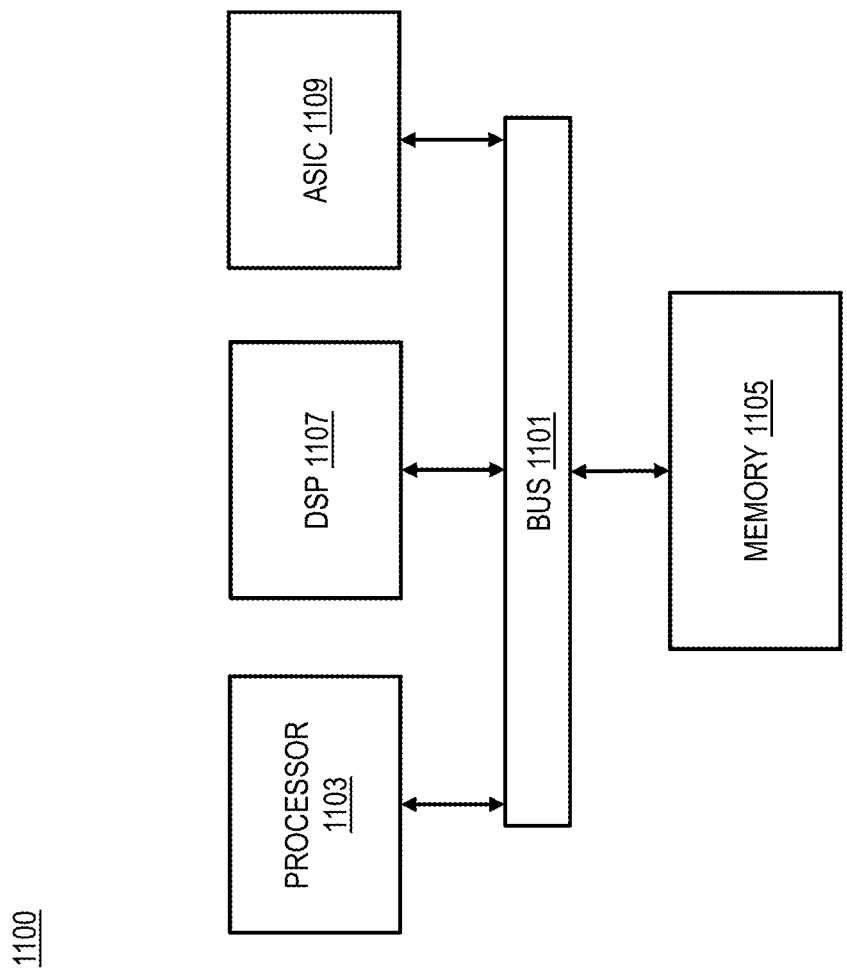
FIG. 11 is a diagram of a chip set that can be used to implement an embodiment of the invention.

FIG. 3 is a flowchart of a process for providing parking availability detection based on vehicle trajectory information, according to one embodiment. In one embodiment, the trajectory processing platform 103 performs the process 300 and is implemented in, for instance, a chip set including a processor and a memory as shown in FIG. 11. In addition or alternatively, all or a portion of the process 300 may be performed locally at the UE 101 (e.g., via the application 111 or another equivalent hardware and/or software component).

In step 301, the trajectory processing platform 103 processes and/or facilitates a processing of trajectory data associated with at least one journey of at least one vehicle to determine at least one portion of the at least one journey that is associated at least one parking search by the at least one vehicle. As discussed above, the trajectory processing platform 103 can process the trajectory data to determine when a vehicle has started a parking search. For example, a driver typically will begin a parking search as the vehicle nears a destination. The parking search then begins extending outward or around from the destination until a parking space is found. Additional discussion of processes for parking search detection are described above with respect to FIGS. 1A and 2, and below with respect to FIGS. 5 and 6.

In step 303, the trajectory processing platform 103 determines one or more street segments associated with the at least one portion of the at least one journey. For example, the trajectory processing platform 103 can perform a map matching of the portion of trajectory data or track that associated with the determined parking search. In one embodiment, the list of streets can also be provided by the vehicles or UEs 101 collecting the trajectory data.

In step 305, the trajectory processing platform 103 causes, at least in part, a classification of the one or more street segments as associated with the at least one parking search. In other words, the street or travel segments identified in step 303 can then be classified or otherwise annotated as being associated with a parking search (e.g., by addition a "search" attribute to the associated road element).

In step 307, the trajectory processing platform 103 determines parking availability information for the one or more street segments based, at least in part, on the trajectory data. In one embodiment, the trajectory processing platform 103 causes, at least in part, a designation of the parking availability information for the one or more street segments associated with a beginning of the at least one parking search and up to a last one of the one or more street segments associated with an ending of the at least one parking search as unavailable. In other words, street segments beginning from when the parking search was initiate up to the ending segment will be assumed by the trajectory processing platform 103 to have no available parking or have parking that is otherwise undesirable by a driver. As previously noted, this is based on the assumption that a driver who is engaged in parking search will only pass by (e.g., not park along) segments for which there is no or undesirable parking.

Additionally, in one embodiment, the trajectory processing platform 103 causes, at least in part, a designation of the parking availability information for the last one of the one or more street segments as available. For example, the trajectory processing platform 103 can assume that the ending segment of a journey is where a driver stops potentially has available parking spaces. However, because the trajectory processing platform 103 is primarily directed towards determining parking availability information for segments along a parking search track, this step is optional.

In one embodiment, the trajectory processing platform 103 determines timestamp information indicating at which time the one or more street segments were traveled by the at least one vehicle during the at least one parking search. The trajectory processing platform 103 then causes, at least in part, an association of the parking availability information with the timestamp information. In one embodiment, the timestamp information can be used to ensure that only the latest one or more records of parking availability collected about a travel segment is presented to a user or used by the trajectory processing platform 103 to recommend a parking search route.

Figure 4:
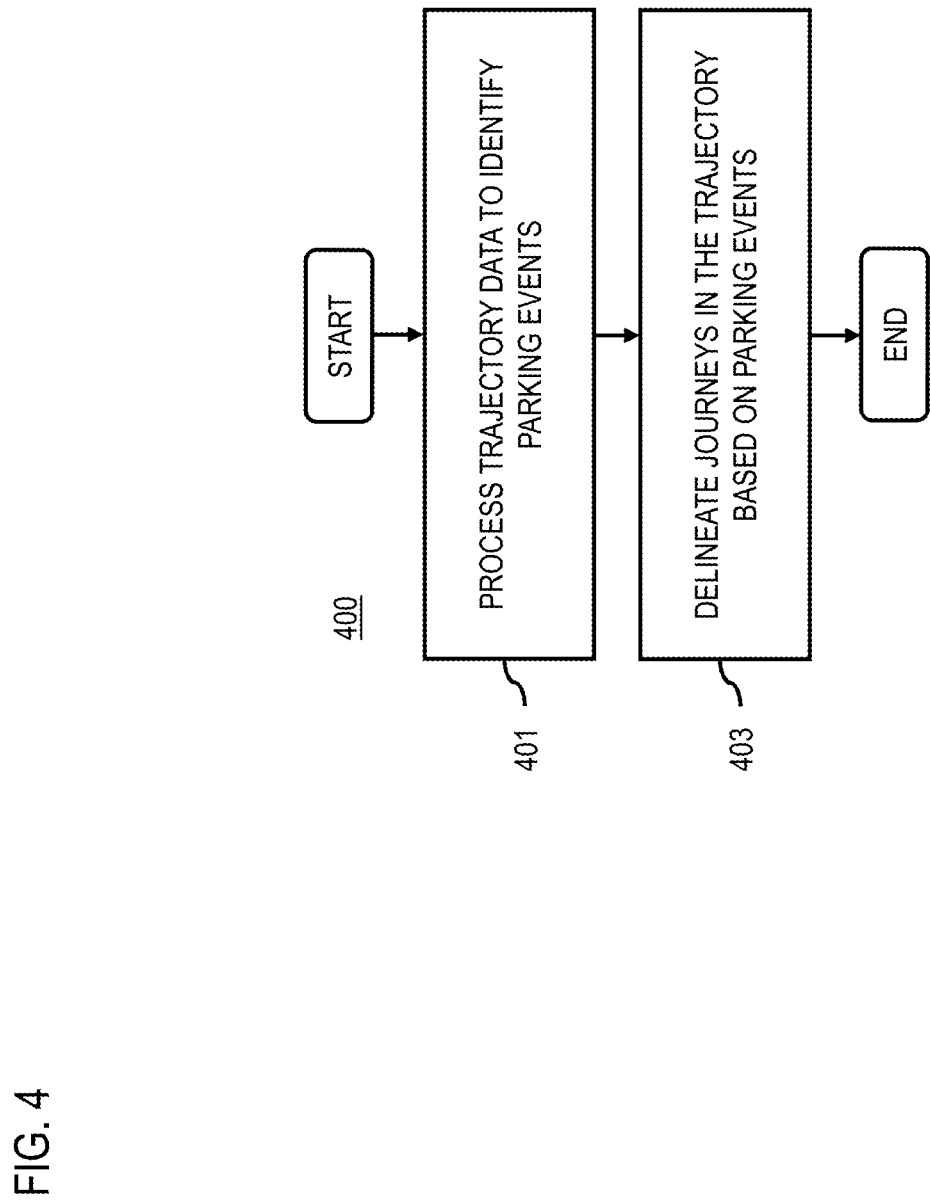
FIG. 4 is a flowchart of a process for extracting journeys from trajectory data, according to one embodiment.

FIG. 4 is a flowchart of a process for extracting journeys from trajectory data, according to one embodiment. In one embodiment, the trajectory processing platform 103 performs the process 400 and is implemented in, for instance, a chip set including a processor and a memory as shown in FIG. 11. In addition or alternatively, all or a portion of the process 300 may be performed locally at the UE 101 (e.g., via the application 111 or another equivalent hardware and/or software component). The process 400 can be used in cases where trajectory data includes a compilation of multiple trips that may or may not be clearly delineated.

In step 401, the trajectory processing platform 103 processes and/or facilitates a processing of the trajectory data to identify one or more parking events. For example, the trajectory processing platform can search for temporal and/or spatial gaps in the trajectory data to identical candidate points where parking events may have occurred. The trajectory processing platform can then use other car sensor data to confirm or identify potential parking events. For example, the trajectory processing platform 103 can query for sensor data from a vehicle to indicate whether the car has shut off its engine, opened its door, locked its door, etc. to indicate that the car was parked. In some embodiments, if accurate location information is available, the trajectory processing platform 103 can determine whether a vehicle's stopped location corresponds to known parking areas or spaces.

In step 403, the trajectory processing platform 103 delineates journeys in the trajectory data based on the determined parking events. To facilitate processing, the trajectory processing platform 103 can split the trajectory data into multiple discreet journeys that include parking events at, for instance, both or either of the start points or endpoints. This discrete journey tracks can then be processing according to the process of FIG. 3.

Figure 5:
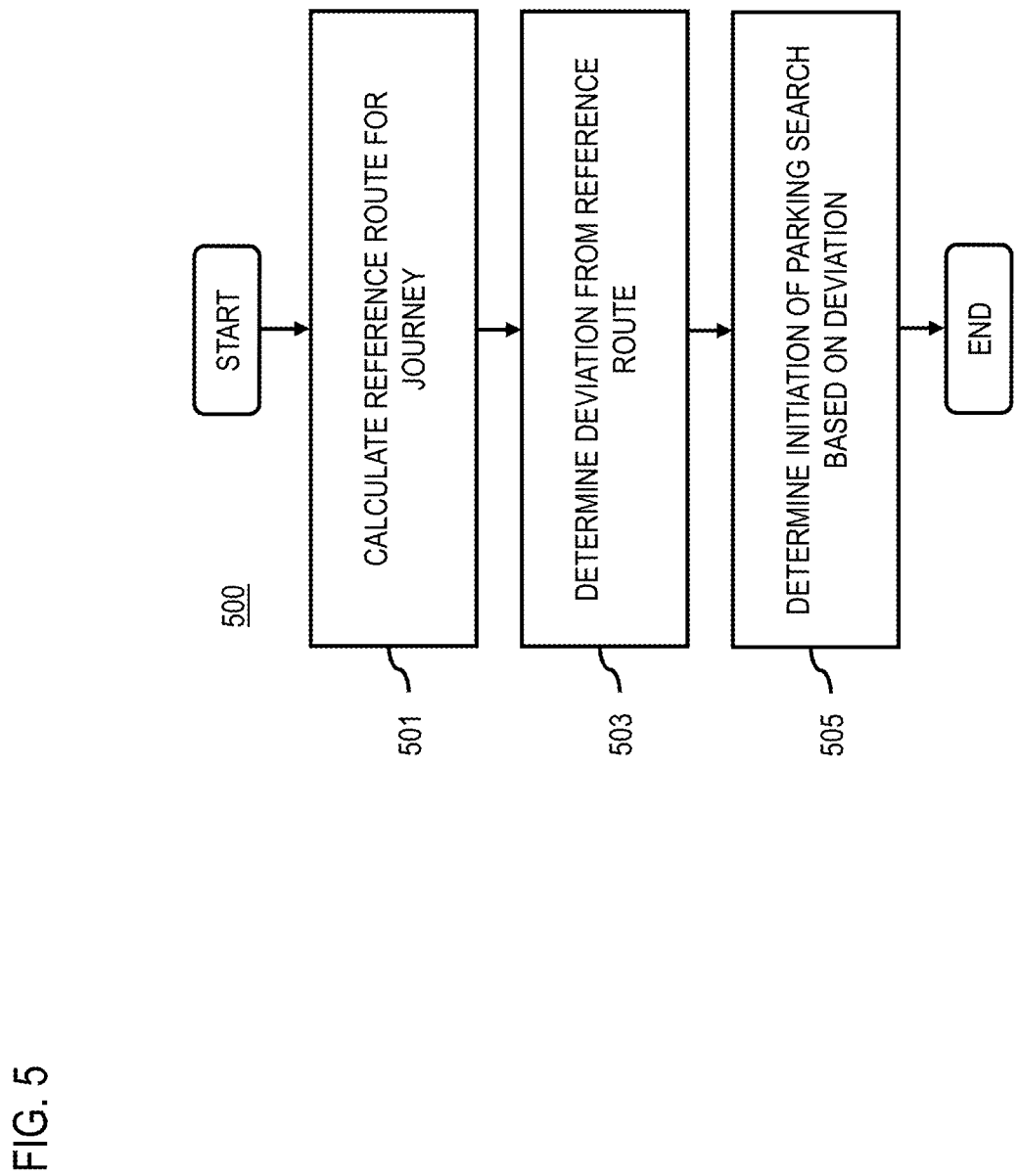
FIG. 5 is a flowchart of a process for determining an initiation of a parking search based on route deviation, according to one embodiment.

FIG. 5 is a flowchart of a process for determining an initiation of a parking search based on route deviation, according to one embodiment. In one embodiment, the trajectory processing platform 103 performs the process 500 and is implemented in, for instance, a chip set including a processor and a memory as shown in FIG. 11. In addition or alternatively, all or a portion of the process 300 may be performed locally at the UE 101 (e.g., via the application 111 or another equivalent hardware and/or software component).

In step 501, the trajectory processing platform 103 causes, at least in part, a calculation of at least one reference route for the one least one journey. For example, the trajectory processing platform 103 can use a routing engine to calculate a from between one or more points of the journey. The routing engine can be configured to match a user's routing preferences (e.g., shortest route, fastest route, or some other customized routing option). The calculated route is considered the reference or optimal route to take in the journey.

In one embodiment, the trajectory processing platform 103 can select at least one previously traveled track from the trajectory data for calculating the reference route. For example, if a final destination is not known (e.g., a user has not entered a destination into a navigation system), then the trajectory processing platform can select a prior point in the track up to another point (e.g., a current point) in the track. It is contemplated that the any track points or segment of the track can be selected for route calculation. In addition, a recursive or repetitive calculation of the route can be performed as previously discussed above. The trajectory processing platform 103 then determines the at least one reference route for the at least one previously driven track.

In step 503, the trajectory processing platform 103 processes and/or facilitates a processing of the trajectory data to determine at least one deviation from the at least one reference route. By way of example, it is assumed that a driver normally will follow an optimal or reference path to a destination. In one embodiment, deviations from this path or route is assumed to be an indicator of that a parking search may have possibly been initiated. For example, a driver may start driving around within proximity of a destination, thereby taking the driver off an optimal route to the destination.

In one embodiment, the trajectory processing platform 103 causes, at least in part, a comparison of a length of the at least one reference route and an actual traveled length of the at least one previously traveled track to determine the at least one deviation. For example, as previously described the trajectory processing platform 103 can calculate a quotient of the actual track length to the optimal or reference route length. If the quotient is close to 1.0 (e.g., within a threshold window), the trajectory processing platform 103 determines that there is no deviation from the reference route. If the quotient is beyond a threshold window around 1.0 (e.g., greater than 1.0 by a threshold value), the trajectory processing platform can determine that there is a deviation from the reference or optimal route.

In step 505, the trajectory processing platform 103 determines an initiation of the at least one parking search based, at least in part, on the at least one deviation.

Figure 6:
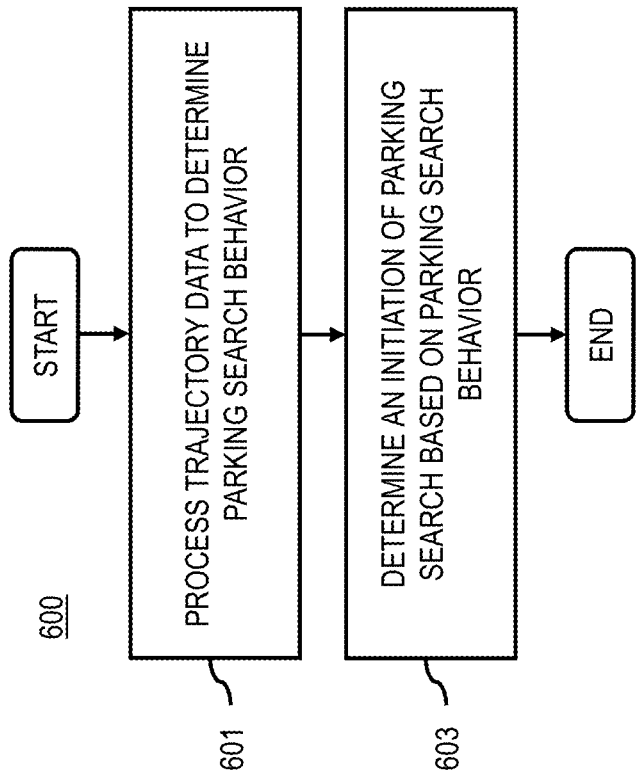
FIG. 6 is a flowchart of a process for determining an initiation of a parking search based on behavior, according to one embodiment.

FIG. 6 is a flowchart of a process for determining an initiation of a parking search based on behavior, according to one embodiment. In one embodiment, the trajectory processing platform 103 performs the process 600 and is implemented in, for instance, a chip set including a processor and a memory as shown in FIG. 11. In addition or alternatively, all or a portion of the process 300 may be performed locally at the UE 101 (e.g., via the application 111 or another equivalent hardware and/or software component). In addition or alternatively to the process described with respect to FIG. 5, the trajectory processing platform 103 can also determine when a parking search is initiated by looking for parking search related behaviors.

For example, in step 601, the trajectory processing platform 103 processes and/or facilitates a processing of the trajectory data to determine one or more parking search behaviors. In one embodiment, the one or more parking search behaviors include, at least in part, but are not limited to one or more self-intersections of at least one driven track, driving multiple times over the one or more street segments, a slower speed profile, travel in an urban area or area with known parking spaces, driving next to one or more known parking lanes, or a combination thereof.

In one embodiment, the trajectory processing platform 103 evaluates the track to determine whether any of the behaviors are observed in the data. In some embodiments, the trajectory processing platform 103 can query for additional sensor data (e.g., engine operation status, door lock status, location of key—inside/outside of car, etc.) to facilitate determine specific behaviors. For example, the trajectory processing platform 103 can create a trajectory or sensor data profile and/or related criteria to associate with each monitored parking search behavior. These profiles can be used to for comparison against the observed tracks and/or sensor data for a vehicle of interest.

In step 603, the trajectory processing platform 103 determines an initiation of the at least one parking search based, at least in part, on the one or more parking search behaviors. For example, if one or more of the behaviors are observed, the trajectory processing platform 103 can determine that a parking search has been initiated in the travel segments corresponding to the observed parking search behaviors.

Figure 7:
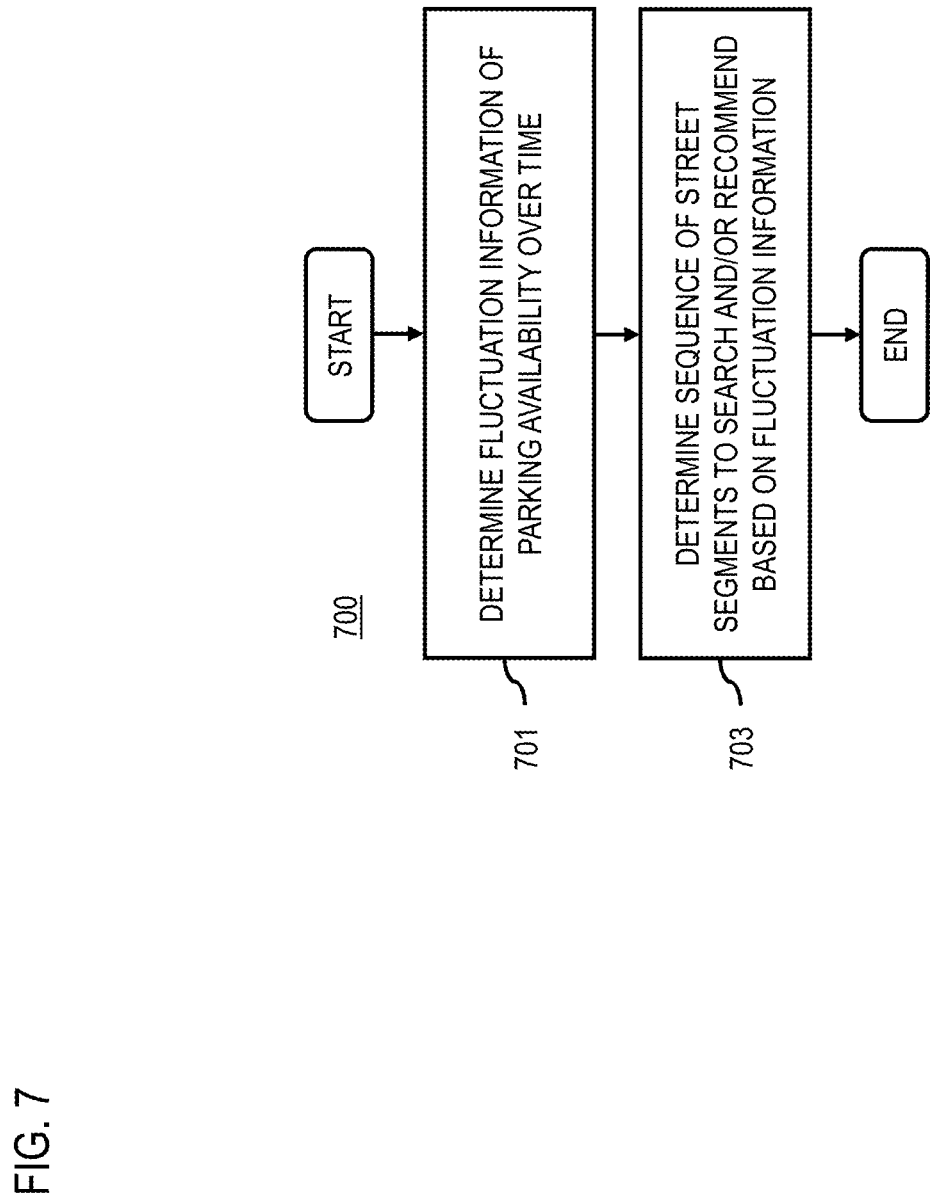
FIG. 7 is a flowchart of a process for determining fluctuation of parking availability information, according to one embodiment.

FIG. 7 is a flowchart of a process for determining fluctuation of parking availability information, according to one embodiment. In one embodiment, the trajectory processing platform 103 performs the process 700 and is implemented in, for instance, a chip set including a processor and a memory as shown in FIG. 11. In addition or alternatively, all or a portion of the process 300 may be performed locally at the UE 101 (e.g., via the application 111 or another equivalent hardware and/or software component).

In step 701, the trajectory processing platform 103 determines fluctuation information of the parking availability information over time. In one embodiment, as the trajectory processing platform 103 collects and/or processes trajectory information and determines parking availability travel segments in those trajectories, the trajectory processing platform 103 can maintain record of the parking availability information (e.g., whether a segment has available parking or not) over time (e.g., based on timestamp information associated with the tracks or trajectories). The trajectory processing platform 103 can then determine much the parking availability information fluctuates or varies (e.g., between parking available or not available, in amount of predicted parking spaces available, etc.) over a predetermined period of time.

In step 703, the trajectory processing platform 103 determines a sequence of the one or more street segments to search, to recommend, or a combination thereof based, at least in part, on the fluctuation information. In other words, the trajectory processing platform 103 can recommend a parking search route to client UEs 101 or vehicles that are engaged in a parking search based on how much the parking availability information fluctuates for a given street or travel segment. For example, a street segment or a sequence of street segment that has greater fluctuation may be recommended to be searched first because they may be more likely to have newly available parking spaces when compared to a segment with lower fluctuation.

Figure 8:
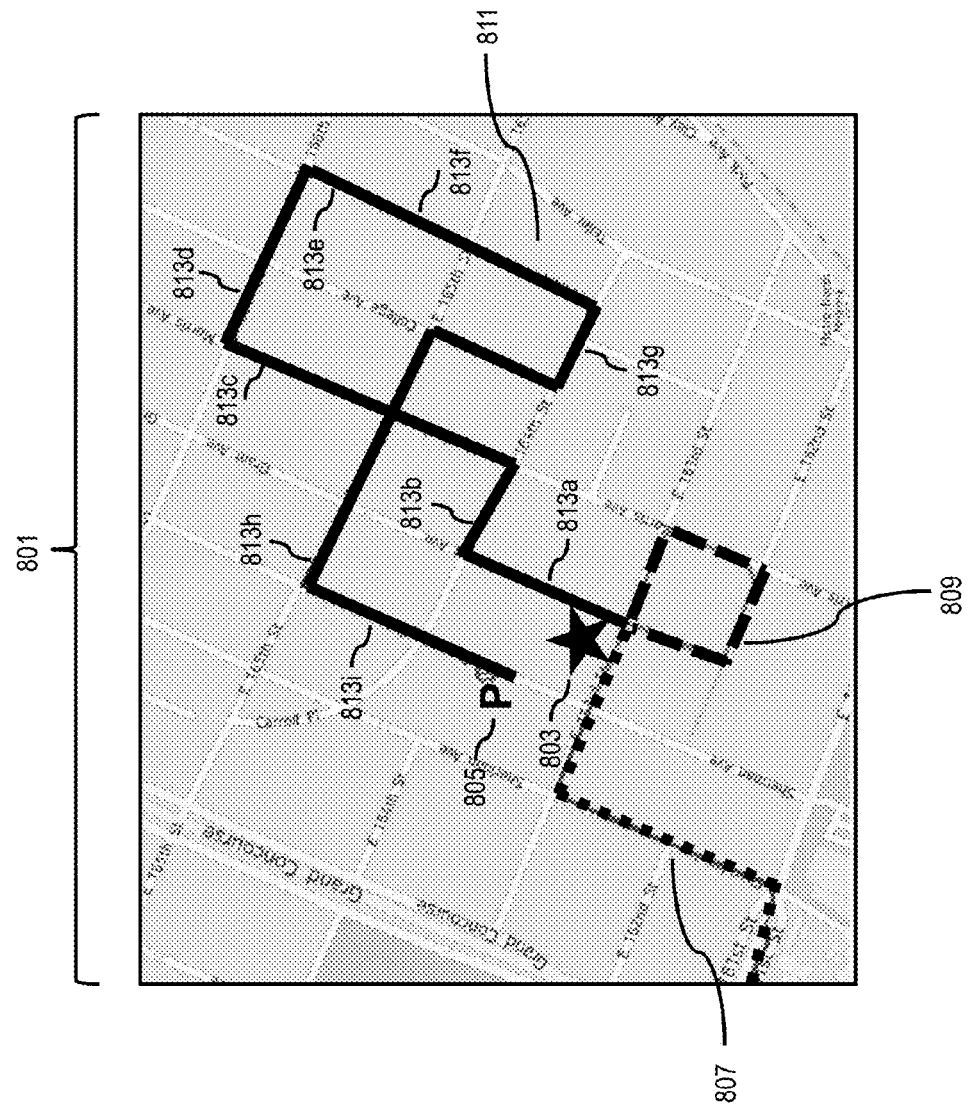
FIG. 8 is a diagram illustrating a process for parking search detection, according to one embodiment.

FIG. 8 is a diagram illustrating a process for parking search detection, according to one embodiment. As shown in FIG. 8, a vehicle trajectory 801 is depicted with a destination point 803 and a parking point 805. The trajectory 801 includes data points indicating, for instance, position, heading, and speed of a vehicle along with timestamp information for each track point in the trajectory. The trajectory 801 is well delineated with a start point (not shown) and an end point corresponding to a parking event at parking point 805.

In this example, the trajectory is then processed according to the embodiments of the parking search detection mechanism described above. The parking search detection resulted in identifying three distinct portions of the trajectory:

(1) driving portion 807 corresponding to segments of the trajectory 801 which the trajectory processing platform 103 has categorized as driving segments;

(2) grayzone portion 809 corresponding to segments of the trajectory 801 which the trajectory processing platform 103 has categorized as grayzone segments (e.g., segments where a parking search may have begun, but the data is unclear); and (3) parking search portion 811 corresponding to segments of the trajectory 801 which the trajectory processing platform 103 has categorized as parking search segments (e.g., as determined by the route optimality process and/or the parking search behavior mechanisms described above).

In one embodiment, the trajectory processing platform 103 can then make an inference about the parking availability in the travel segments 813a-813i associated with the parking search portion 809 of the trajectory 801. For example, for the segments 813a-813h up to the last segment 813i, the trajectory processing platform 103 can designate the parking availability in those sections as not available or otherwise undesirable. As previously described, this designation is based on the assumption that segments that are passed over by a driver during a parking segment do not have available or desirable parking. In one embodiment, because the driver has found parking in the last segment 813i, the trajectory processing platform 103 can infer that parking is available in that segment. In other embodiments, the trajectory processing platform 103 can be configured to make other or different inferences about the last segment 813i.

Figure 9A:
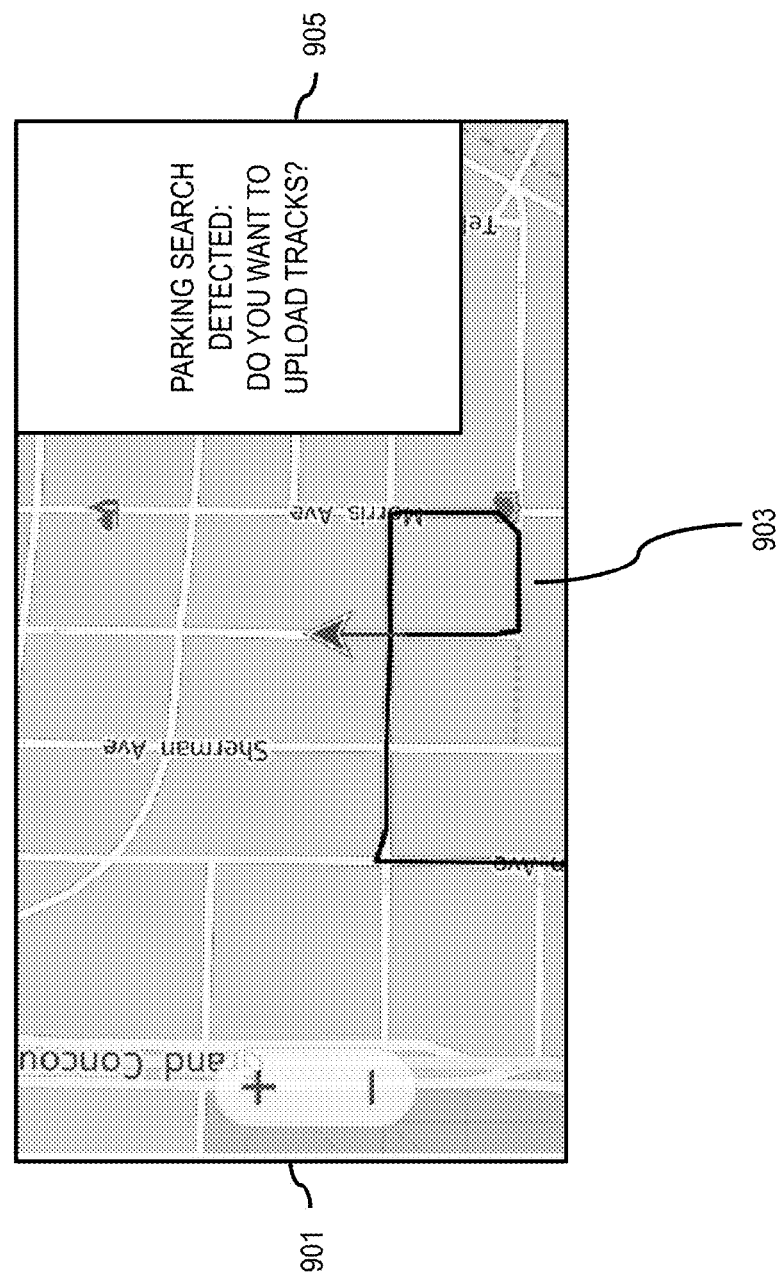
FIGS. 9A and 9B are diagrams of user interfaces used in the processes for providing parking availability detection based on vehicle trajectory information, according to various embodiments.
Figure 9B:
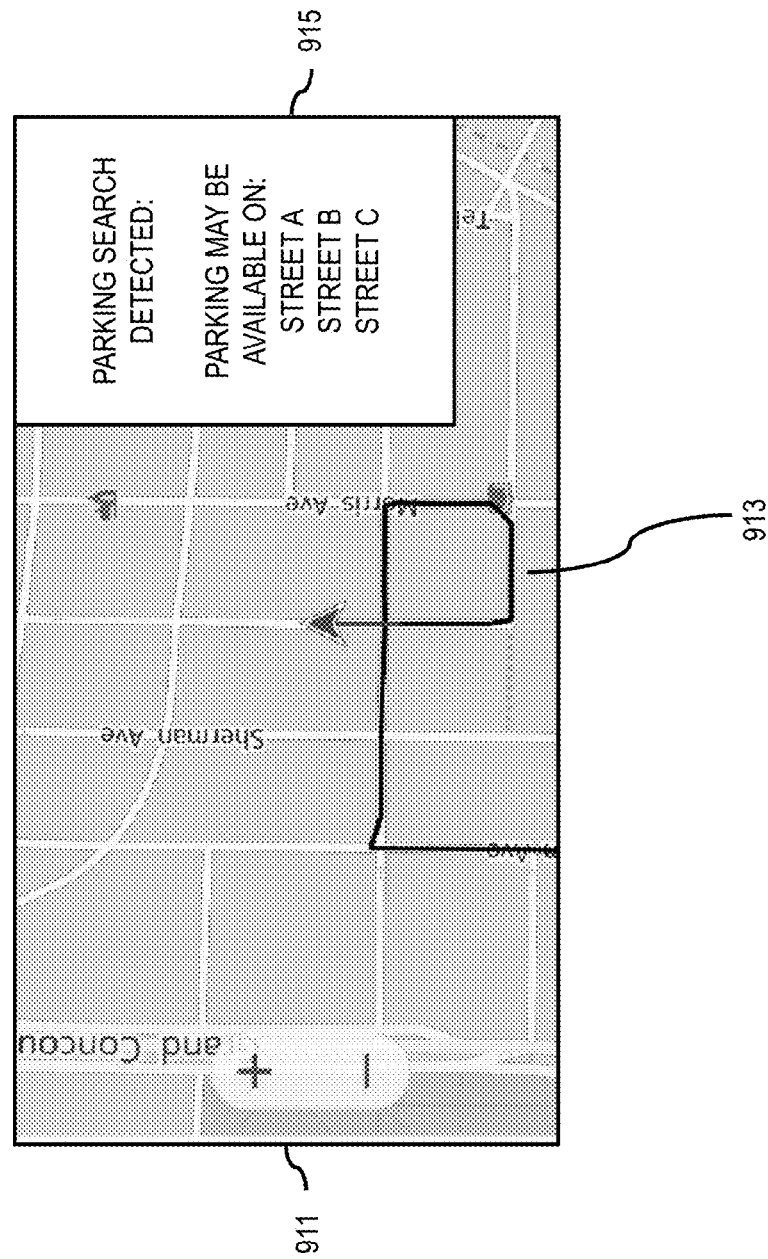

FIGS. 9A and 9B are diagrams of user interfaces used in the processes for providing parking availability detection based on vehicle trajectory information, according to various embodiments. More specifically, FIGS. 9A and 9B illustrate user interfaces that can be used in real-time by data-collection vehicles (FIG. 9A) and client vehicles (FIG. 9B) participating in a parking availability service provided by the system 100.

For example, from a data-collection perspective, a user interface (UI) 901 presents a live view a vehicle trajectory 903 as the data-collection vehicle is traveling in a road network. In one embodiment, the trajectory 903 is continually processed (e.g., by the trajectory processing platform 103 and/or the application 111) for parking search detection. In this example, a parking search has been detected and because the UI 901 is for data collection, the UI 901 presents a notification 905 to the driver that a parking search has been detected and asks the driver whether the driver would like to upload this track to the trajectory processing platform 103.

By uploading the track, the driver can contribute to the trajectory data available to the trajectory processing platform 103 which in turn can extract parking availability information for distribution to other client devices.

FIG. 9B illustrates a UI 911 from a client device's perspective. This example is similar to the example of FIG. 9A. For example, as shown, the UI 901 presents a live view of a client vehicle's trajectory 913 as the client-vehicle is traveling a road network. As with FIG. 9A, the trajectory 913 is continually processed (e.g., by the trajectory processing platform 103 and/or the application 111) for parking search detection. However, when a parking search is detected for the client vehicle, the UI 911 presents a notification 915 alerting the driver that a parking search has been detected and then providing a recommended list of nearby streets that are recommended for searching based on the parking availability information available to the trajectory processing platform 103. In some embodiments, the UI 911 can also present navigation instructions and/or additional information about the parking available on the recommended street (e.g., time of last status update, confidence, fluctuation, etc.).

The processes described herein for providing parking availability detection based on vehicle trajectory information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
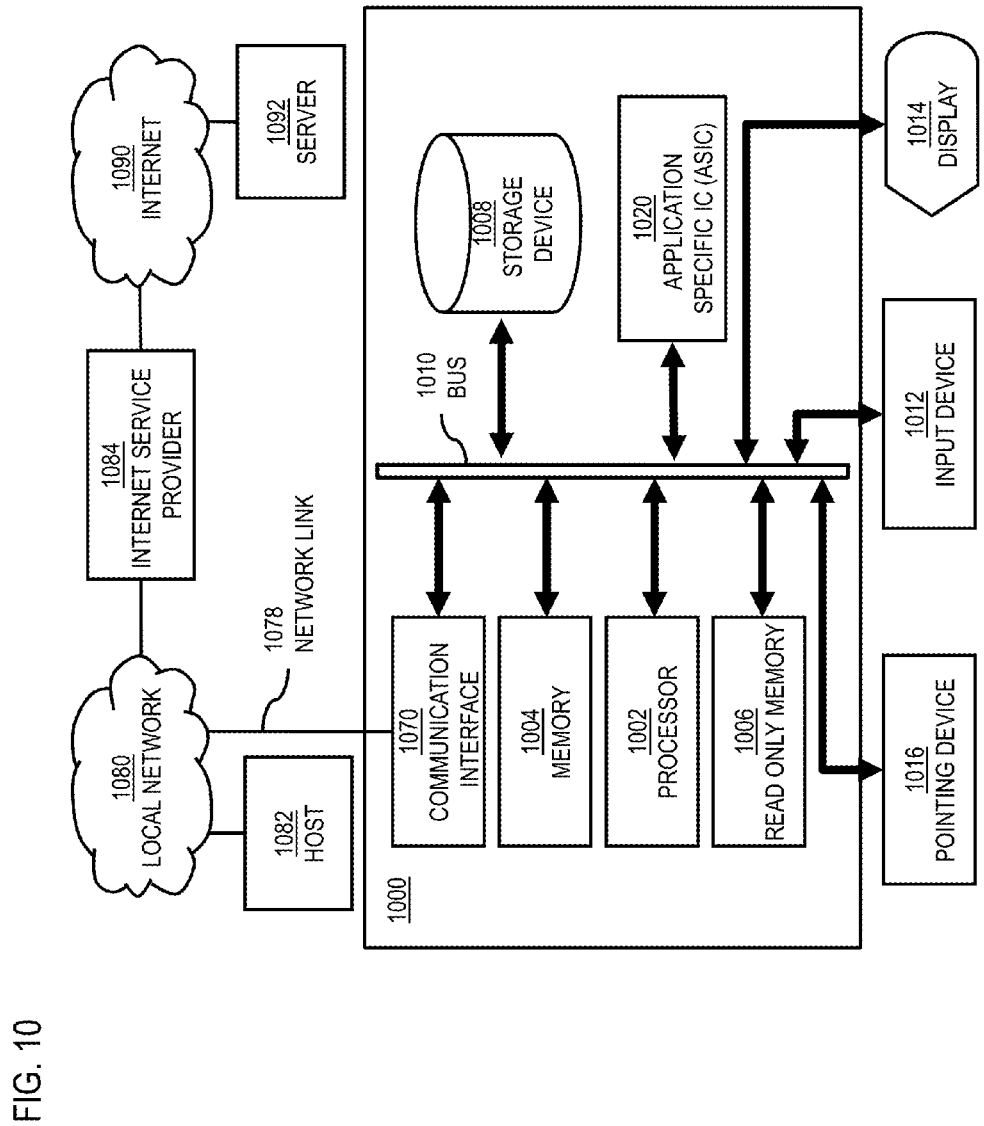
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to provide parking availability detection based on vehicle trajectory information as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing parking availability detection based on vehicle trajectory information.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to providing parking availability detection based on vehicle trajectory information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for providing parking availability detection based on vehicle trajectory information. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing parking availability detection based on vehicle trajectory information, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED)

display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless devices, such as mobile computers like vehicle infotainment system, the communications interface 1070 includes a radio band electromagnetic transmitter and receiver called a radio transceiver. In certain embodiments, the communications interface 1070 enables connection to the communication network 105 for providing parking availability detection based on vehicle trajectory information to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to provide parking availability detection based on vehicle trajectory information as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of providing parking availability detection based on vehicle trajectory information.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide parking availability detection based on vehicle trajectory information. The memory 1105 also stores the data associated with or generated by the execution of the inventive steps.

Figure 12:
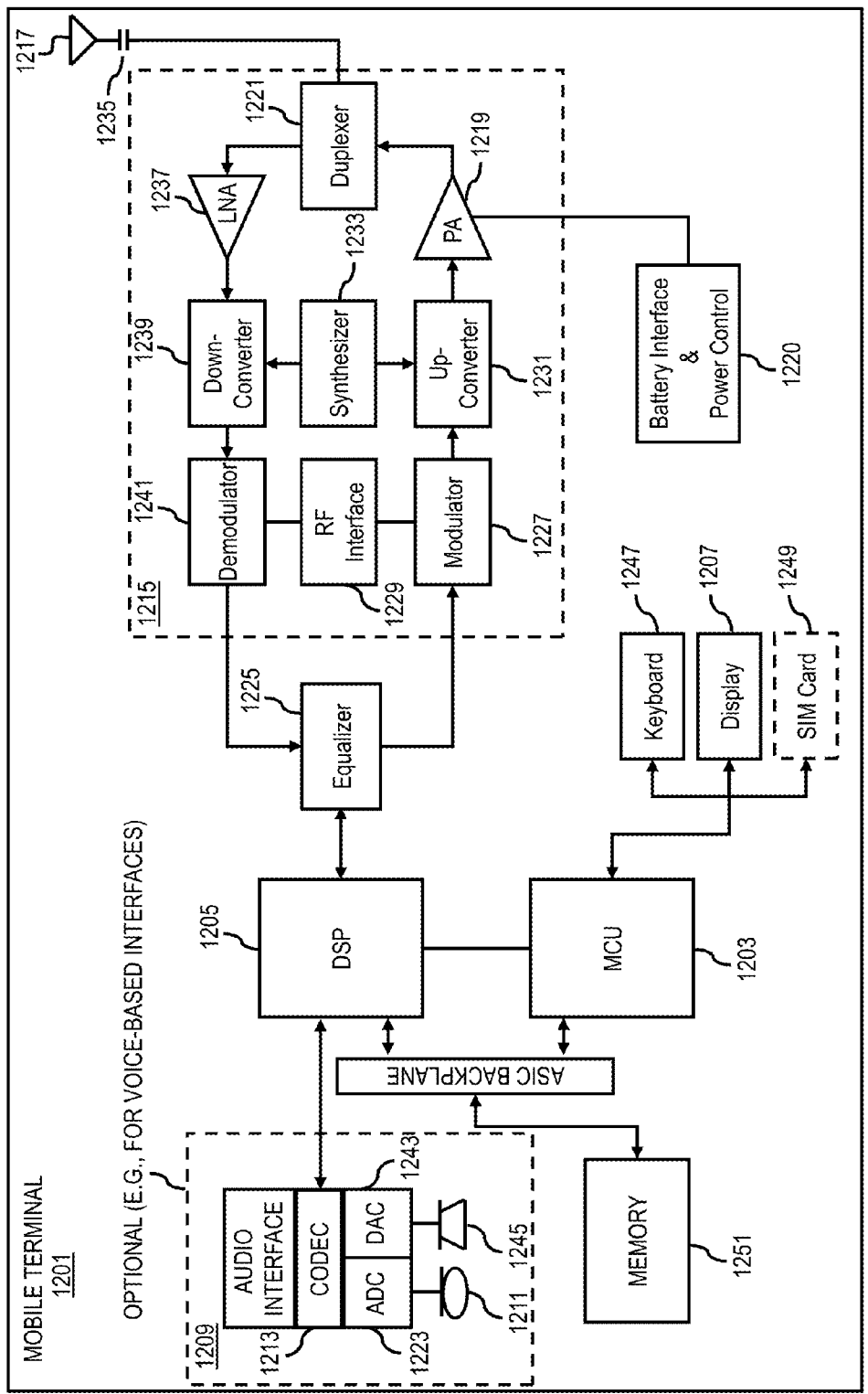
FIG. 12 is a diagram of a mobile terminal (e.g., mobile computer) that can be used to implement an embodiment of the invention.

FIG. 12 is a diagram of exemplary components of a mobile terminal (e.g., mobile computers such as vehicle infotainment system, vehicle embedded system, smartphones, etc.) for communications, which is capable of operating in the system of FIG. 1, according to one embodiment. In some embodiments, mobile terminal 1201, or a portion thereof, constitutes a means for performing one or more steps of providing parking availability detection based on vehicle trajectory information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile computer or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile computer or a similar integrated circuit in network device (e.g., a cellular network device or data other network devices).

Pertinent internal components of the mobile terminal include a Main Control Unit (MCU) 1203, a Digital Signal Processor (DSP) 1205, and a receiver/transmitter unit. In one embodiment, wherein voice-based interaction and/or communications are supported at the mobile terminal, the mobile terminal may also include a microphone gain control unit and a speaker gain control unit. A main display unit 1207 provides a display to the user in support of various applications and mobile terminal functions that perform or support the steps of providing parking availability detection based on vehicle trajectory information. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. In embodiments supporting voice-based interactions and/or communications, an audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station (e.g., data and/or voice communications), which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, data to support providing parking availability detection based on vehicle trajectory information is formatted into network packets (e.g., Internet Protocol (IP) packets) for transmission using one or more network transmission protocol (e.g., a cellular network transmission protocol described in more detail below). In one embodiment, the network packets include control information and payload data, with the control information specifying originating/destination network addresses, error control signals, signals for reconstructing the user data from the packets, and/or other related information. In embodiments supporting voice-based interaction and/or communications, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech recognition, speech encoding, channel encoding, encrypting, and interleaving.

In one embodiment, the processed network packets and/or voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission through the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The local base station or similar component then forwards data or network packets to a gateway server (e.g., a gateway to the Internet) for connectivity to network components used for providing parking availability detection. In embodiments supporting voice-based interactions and/or communications, voice signals may be forwarded from the local base station to a remote terminal which may be another mobile computer, cellular telephone, and/or any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide parking availability detection based on vehicle trajectory information. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details (e.g., data and/or voice subscriptions), and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing and/or facilitating a processing of trajectory data associated with at least one journey of at least one vehicle to determine at least one deviation from at least one reference route calculated for the at least one journey;
   determining an initiation of at least one parking search based on the at least one deviation;
   determining at least one portion of the at least one journey that is associated with the at least one parking search by the at least one vehicle;
   determining one or more street segments associated with the at least one portion of the at least one journey;
   causing, at least in part, a classification of the one or more street segments as associated with the at least one parking search; and
   determining parking availability information for the classified one or more street segments based, at least in part, on the trajectory data.

2. A method of claim 1, wherein the determining of the parking availability information comprises:
   causing, at least in part, a designation of the parking availability information for the one or more street segments associated with a beginning of the at least one parking search and up to a last one of the one or more street segments associated with an ending of the at least one parking search as unavailable.

3. A method of claim 2, further comprising:
   causing, at least in part, a designation of the parking availability information for the last one of the one or more street segments as available.

4. A method of claim 1, further comprising:
   determining timestamp information indicating at which time the one or more street segments were traveled by the at least one vehicle during the at least one parking search; and
   causing, at least in part, an association of the parking availability information with the timestamp information.

5. A method of claim 1, further comprising:
   selecting at least one previously traveled track from the trajectory data;
   determining the at least one reference route for the at least one previously driven track; and
   causing, at least in part, a comparison of a length of the at least one reference route and an actual traveled length of the at least one previously traveled track to determine the at least one deviation.

6. A method of claim 1, further comprising:
   processing and/or facilitating a processing of the trajectory data to determine one or more parking search behaviors; and
   determining an initiation of the at least one parking search based, at least in part, on the one or more parking search behaviors.

7. A method of claim 6, wherein the one or more parking search behaviors include, at least in part, one or more self-intersections of at least one driven track, driving multiple times over the one or more street segments, a slower speed profile, travel in an urban area or area with known parking spaces, driving next to one or more known parking lanes, or a combination thereof.

8. A method of claim 1, further comprising:
   determining fluctuation information of the parking availability information over time; and
   determining a sequence of the one or more street segments to search, to recommend, or a combination thereof based, at least in part, on the fluctuation information.

9. A method of claim 1, wherein the at least one journey is delineated within the trajectory data by one or more parking events.

10. An apparatus comprising:
    at least one processor; and
    at least one memory including computer program code for one or more programs,
    the at least one memory and the computer program code configured to, with the at least one processor, cause the apparatus to perform at least the following,
    process and/or facilitate a processing of trajectory data associated with at least one journey of at least one vehicle to determine at least one deviation from at least one reference route calculated for the at least one journey;
    determine an initiation of at least one parking search based on the at least one deviation;
    determine at least one portion of the at least one journey that is associated with at least one parking search by the at least one vehicle;
    determine one or more street segments associated with the at least one portion of the at least one journey;
    cause, at least in part, a classification of the one or more street segments as associated with the at least one parking search; and
    determine parking availability information for the classified one or more street segments based, at least in part, on the trajectory data.

11. An apparatus of claim 10, wherein the determination of the parking availability information further causes the apparatus to:
    cause, at least in part, a designation of the parking availability information for the one or more street segments associated with a beginning of the at least one parking search and up to a last one of the one or more street segments associated with an ending of the at least one parking search as unavailable.

12. An apparatus of claim 11, wherein the apparatus is further caused to:
    cause, at least in part, a designation of the parking availability information for the last one of the one or more street segments as available.

13. An apparatus of claim 10, wherein the apparatus is further caused to:
- determine timestamp information indicating at which time the one or more street segments were traveled by the at least one vehicle during the at least one parking search; and
- cause, at least in part, an association of the parking availability information with the timestamp information.

14. An apparatus of claim 10, wherein the apparatus is further caused to:
- process and/or facilitate a processing of the trajectory data to determine one or more parking search behaviors; and
- determine an initiation of the at least one parking search based, at least in part, on the one or more parking search behaviors.

15. An apparatus of claim 10, wherein the apparatus is further caused to:
- determine fluctuation information of the parking availability information over time; and
- determine a sequence of the one or more street segments to search, to recommend, or a combination thereof based, at least in part, on the fluctuation information.

16. An apparatus of claim 10, wherein the apparatus is further caused to:
- select at least one previously traveled track from the trajectory data;
- determine the at least one reference route for the at least one previously driven track; and
- cause, at least in part, a comparison of a length of the at least one reference route and an actual traveled length of the at least one previously traveled track to determine the at least one deviation.

17. A non-transitory computer-readable storage medium carrying one or more sequences of one or more instructions which, when executed by one or more processors, cause an apparatus to at least perform the following steps:
- processing and/or facilitating a processing of trajectory data associated with at least one journey of at least one vehicle to determine at least one deviation from at least one reference route calculated for the at least one journey;
- determining an initiation of at least one parking search based on the at least one deviation;
- determining at least one portion of the at least one journey that is associated with the at least one parking search by the at least one vehicle;
- determining one or more street segments associated with the at least one portion of the at least one journey;
- causing, at least in part, a classification of the one or more street segments as associated with the at least one parking search; and
- determining parking availability information for the classified one or more street segments based, at least in part, on the trajectory data.

18. A non-transitory computer-readable storage medium of claim 17, wherein the determining of the parking availability information further causes the apparatus to perform:
- causing, at least in part, a designation of the parking availability information for the one or more street segments associated with a beginning of the at least one parking search and up to a last one of the one or more street segments associated with an ending of the at least one parking search as unavailable; and
- causing, at least in part, a designation of the parking availability information for the last one of the one or more street segments as available.

19. A non-transitory computer-readable storage medium of claim 17, wherein the apparatus is further caused to perform:
- determining timestamp information indicating at which time the one or more street segments were traveled by the at least one vehicle during the at least one parking search; and
- causing, at least in part, an association of the parking availability information with the timestamp information.

20. A non-transitory computer-readable storage medium of claim 17, wherein the apparatus is further caused to perform:
- selecting at least one previously traveled track from the trajectory data;
- determining the at least one reference route for the at least one previously driven track; and
- causing, at least in part, a comparison of a length of the at least one reference route and an actual traveled length of the at least one previously traveled track to determine the at least one deviation.

\* \* \* \* \*